US012705074B2

(12) United States Patent
Li et al.

(10) Patent No.: US 12,705,074 B2
(45) Date of Patent: Aug. 11, 2026

(54) ELEMENT DISPLAY METHOD AND APPARATUS, AND ELECTRONIC DEVICE AND STORAGE MEDIUM

(71) Applicant: Beijing Zitiao Network Technology Co., Ltd., Beijing (CN)

(72) Inventors: Qi Li, Beijing (CN); Xiaoqi Li, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 231 days.

(21) Appl. No.: 18/723,389

(22) PCT Filed: Dec. 20, 2022

(86) PCT No.: PCT/CN2022/140202
§ 371 (c)(1), (2) Date: Jun. 21, 2024

(87) PCT Pub. No.: WO2023/116653
PCT Pub. Date: Jun. 29, 2023

(65) Prior Publication Data

US 2025/0165266 A1 May 22, 2025

(30) Foreign Application Priority Data

Dec. 21, 2021 (CN) ......................... 202111572656.7

(51) Int. Cl.
*G06F 9/451* (2018.01)
*G06T 13/60* (2011.01)

(52) U.S. Cl.
CPC .............. *G06F 9/451* (2018.02); *G06T 13/60* (2013.01)

(58) Field of Classification Search
CPC ................................ G06F 9/451; G06T 13/60
(Continued)

(56) References Cited

U.S. PATENT DOCUMENTS 9,613,270 B2 * 4/2017 Sun ......................... G01W 1/06
10,049,477 B1 * 8/2018 Kokemohr .............. G06T 11/60
(Continued)

FOREIGN PATENT DOCUMENTS

CN 109241465 A 1/2019
CN 109960448 A 7/2019
(Continued)

OTHER PUBLICATIONS

International Search Report for PCT/CN2022/140202, mailed Feb. 23, 2023, 5 pages.
(Continued)

*Primary Examiner* — William D Titcomb
(74) *Attorney, Agent, or Firm* — Astute IP Law Group

(57) ABSTRACT

Embodiments of the disclosure disclose a method and apparatus for displaying an element, an electronic device, and a storage medium. The method includes: displaying a weather display element in a target display area according to a first motion trajectory; displaying, in response to detecting that the weather display element collides with a scene target element in the target display area, the weather display element in the target display area according to a second motion trajectory; and continuously displaying a weather display element that does not collide with the scene target element in the target display area according to the first motion trajectory.

20 Claims, 7 Drawing Sheets

(58) Field of Classification Search
USPC .......................................................... 382/103
See application file for complete search history.

(56) References Cited

U.S. PATENT DOCUMENTS

| | | | | |
|---|---|---|---|---|
| 10,937,218 | B2 * | 3/2021 | Barragan | G06F 3/04842 |
| 11,790,610 | B2 * | 10/2023 | Thomas | G06T 19/006 345/419 |
| 12,518,441 | B2 * | 1/2026 | Wang | G06T 11/10 |
| 2016/0048995 | A1 * | 2/2016 | Sun | G06V 30/422 345/474 |
| 2020/0265616 | A1 * | 8/2020 | Kim | G06T 5/77 |
| 2021/0005002 | A1 * | 1/2021 | Barragan | G06F 3/04842 |
| 2025/0165266 | A1 * | 5/2025 | Li | G06T 13/60 |

FOREIGN PATENT DOCUMENTS

| | | | |
|---|---|---|---|
| CN | 110180182 | A | 8/2019 |
| CN | 110992456 | A | 4/2020 |
| CN | 112950535 | A | 6/2021 |
| CN | 113474822 | A | 10/2021 |
| CN | 113516739 | A | 10/2021 |
| CN | 114253647 | A | 3/2022 |

OTHER PUBLICATIONS

Office Action for Chinese Patent Application No. 202111572656.7, mailed Jun. 16, 2023, 24 pages.

* cited by examiner

ELEMENT DISPLAY METHOD AND APPARATUS, AND ELECTRONIC DEVICE AND STORAGE MEDIUM

CROSS REFERENCE TO RELATED APPLICATIONS

The disclosure is a U.S. National Stage Application of PCT Application Serial No. PCT/CN2022/140202, filed on Dec. 20, 2022, which claims the priority to Chinese Patent Application No. 202111572656.7, filed to the Chinese Patent Office on Dec. 21, 2021, the disclosures of which are incorporated herein by reference in their entireties.

FIELD

Embodiments of the disclosure relate to the technical field of image processing, and for example, relate to an element display method and apparatus for displaying an element, an electronic device, and a storage medium.

BACKGROUND

Rapid and accurate dissemination of various information has become a universal appeal in a fast-paced living environment. As a short and vivid way of information dissemination, short videos are highly popular. Particularly, short videos that become more interesting through various effect props for users are favored.

In a common short video added with an effect, a display mode of an effect prop is generally fixed and lacks interaction with a user, which makes an overall display effect of the short video relatively simple and influences user experience.

SUMMARY

Embodiments of the disclosure provide an element display method and apparatus, an electronic device, and a storage medium, so as to improve an image display effect.

In a first aspect, an embodiment of the disclosure provides an element display method. The method includes: displaying a weather display element in a target display area according to a first motion trajectory; displaying, in response to detecting that the weather display element collides with a scene target element in the target display area, the weather display element in the target display area according to a second motion trajectory; and continuously displaying a weather display element that does not collide with the scene target element in the target display area according to the first motion trajectory.

In a second aspect, an embodiment of the disclosure further provides an apparatus display method. The apparatus includes: a first display module configured to display a weather display element in a target display area according to a first motion trajectory; a second display module configured to display, in response to detecting that the weather display element collides with a scene target element in the target display area, the weather display element in the target display area according to a second motion trajectory; and a third display module configured to continuously display a weather display element that does not collide with the scene target element in the target display area according to the first motion trajectory. In a third aspect, an embodiment of the disclosure further provides an electronic device. The electronic device includes: a processor; and a storage apparatus configured to store a program. When the processor executes the program, the processor implements the element display method according to any one of the embodiments of the disclosure.

In a fourth aspect, an embodiment of the disclosure further provides a computer-readable storage medium. The computer-readable storage medium stores a computer program. When the computer program implements the element display method according to any one of the embodiments of the disclosure when being executed by a processor.

DETAILED DESCRIPTION OF EMBODIMENTS

Figure 1:
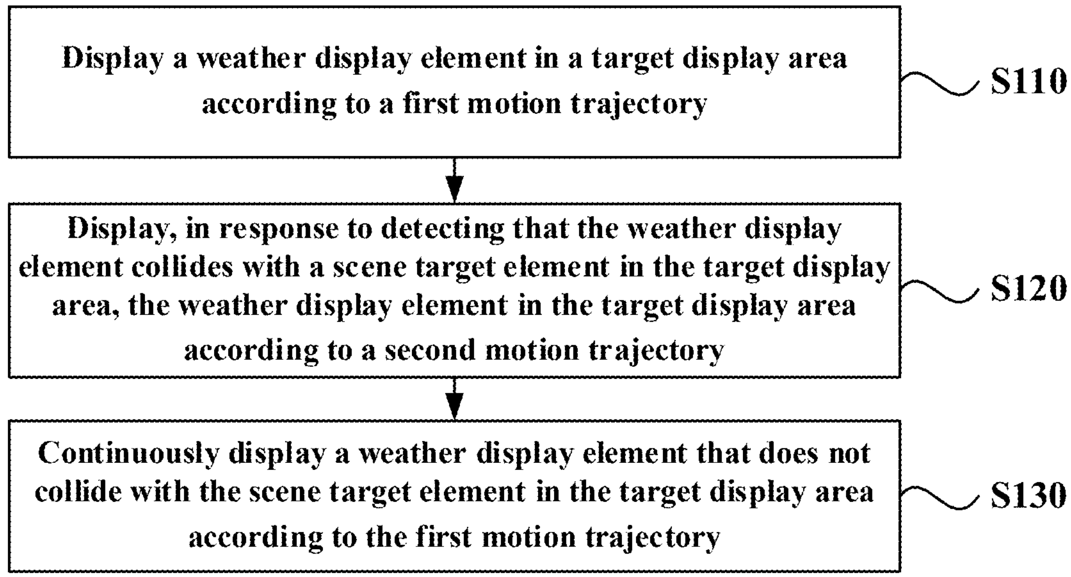
FIG. 1 is a schematic flow diagram of an element display method according to Embodiment 1 of the disclosure.

Embodiments of the disclosure will be described below with reference to the accompanying drawings. Although some embodiments of the disclosure are shown in the accompanying drawings, it should be understood that the disclosure may be implemented in various forms, and the embodiments are provided for a more thorough and complete understanding of the disclosure. It should be understood that the drawings and the embodiments of the disclosure are only for illustrative purposes.

It should be understood that a plurality of steps described in method embodiments of the disclosure may be executed in a different order and/or in parallel. Further, the method embodiments may include additional steps and/or omit execution of the illustrated steps, The terms "include" and "comprise" used herein and their variations are open-ended, that is, "including but not limited to" and "comprising but not limited to". The term "based on" means "at least partly based on". The term "an embodiment" means "at least one embodiment". The term "another embodiment" means "at least another embodiment". The term "some embodiments" means "at least some embodiments". Related definitions of other terms will be given in the following description.

It should be noted that concepts such as "first" and "second" mentioned in the disclosure are only used to distinguish different apparatuses, modules or units. It should be noted that modification of "a", "an" or "a plurality of" mentioned in the disclosure is illustrative, and should be understood by those skilled in the art as "one or more" unless explicitly stated otherwise in the context.

Names of messages or information exchanged between a plurality of apparatuses in the embodiment of the disclosure are only for illustrative purposes.

In order to facilitate understanding, before the embodiment of the disclosure is introduced, an application scene of an element display method according to the embodiment of the disclosure will be firstly introduced. A plurality of elements may be understood as two or more elements to be displayed in an image. In order to highlight an effect of an interaction scene of collision, a plurality of images continuously played may be processed. The images may include display information of a plurality of elements before, during and after collision of the elements. For example, each image of a short video may be extracted, and each image may be processed through the element display method according to the embodiment of the disclosure.

It should be noted that at least one of a weather display element and a scene target element may appear in each frame of the short video, or in some images of the short video. The method of the embodiment is suitable for a scene in which two or more display elements may collide with each other, and the two display elements may collide with each other or not. Whether the two display elements collide with each other is determined according to display information of the two display elements.

The element display method according to the embodiment of the disclosure is particularly suitable for various effect scenes. The weather display element may be a preset effect prop, and for example, at least one of a snow element, a water element, and an ice element. The scene target element may be an object to which the effect prop is applied, and for example, a person, an animal, a building, a tree, etc.

It should be noted that in the embodiment of the disclosure, the element display method according to the embodiment of the disclosure may be used to process each weather display element displayed in a target display area, so as to obtain a display effect of each weather display element and the scene target element. The element display method according to the embodiment of the disclosure is introduced from a perspective of processing a weather display element.

Embodiment 1

FIG. 1 is a schematic flow diagram of an element display method according to Embodiment 1 of the disclosure. The embodiment is suitable for a case in which a plurality of display elements are displayed in an image, and particularly a case in which a plurality of elements interact with each other. The method may be executed by an apparatus display method. The apparatus may be implemented by means of software and/or hardware, and may be configured in a terminal and/or a server, so as to implement the element display method according to the embodiment of the disclosure.

In the embodiment, the apparatus configured to execute the element display method according to the embodiment of the disclosure may be integrated in application software supporting an image processing function. The software may be mounted in an electronic device. Optionally, the electronic device may be a mobile terminal, a personal computer (PC) terminal, etc. The application software may be a type of software for image/video processing. Specifically, the application software may only implement image/video processing. Alternatively, the application software may be an application program specially developed, so as to implement software that may add and display an effect, or may be integrated in a corresponding page. A user may add an effect by means of a page integrated in the PC.

As shown in FIG. 1, the method of the embodiment may include the following steps:

S110. A weather display element is displayed in a target display area according to a first motion trajectory.

In the embodiment, the weather display element may be a preset display element, and may be a scene element in an image. Exemplarily, the weather display element may include at least one of a snow element, a wind element, a water element, and an ice element. The setting has advantages that expected scene weather may be displayed through addition of a meteorological element, and a unique weather effect may be shown. Exemplarily, the weather display element may be created based on a material point method (MPM), such that natural weather is simulated.

In the embodiment, the first motion trajectory may be a preset motion trajectory corresponding to the weather display element, or a motion trajectory generated by simulating a motion state of the weather display element in a real environment according to a preset algorithm. The preset algorithm may be determined according to the weather display element. Optionally, the motion state of the weather display element may be a free-fall state.

In the embodiment of the disclosure, before the weather display element is displayed in the target display area according to the first motion trajectory, a target display mode of the weather display element is determined according to a preset motion related parameter corresponding to the weather display element, such that the weather display element may be displayed in the target display area according to the target display mode. The target display mode includes the first motion trajectory. Optionally, the target display mode may further include initial velocity information and/or an initial display position. The initial velocity information may be preset velocity information without respect to gravity, or free-fall velocity information, or velocity information obtained by superposing gravity information on preset velocity information, or velocity information obtained by superposing environmental interference information on preset velocity information. The initial display position may be understood as a preset start position at which the weather display element starts to be displayed. It may be understood that the target display modes of all the weather display elements may be the same or different, specific display modes of which may be set according to actual needs. For example, the target display mode of the weather display element may be determined according to a preset weather type. The weather type may be blizzard, heavy snow, moderate snow, light snow, rainstorm, rainstorm, heavy rain, moderate rain, light snow, heavy hail, moderate hail, or light hail, and may also be wind of a certain level, and for example, strong wind of level 7 or typhoon.

In the embodiment of the disclosure, the number of weather display elements in an image displayed in the target display area may be one, two or more. When a plurality of weather display elements need to be displayed in the target display area, optionally, the plurality of weather display elements are displayed in the target display area according to the first motion trajectory in a preset display form. The preset display form may be mass, flow or block. Certainly, the weather display elements may be randomly displayed in the target display area. In the embodiment of the disclosure, the plurality of weather display elements may be displayed in the target display area according to the first motion trajectory in the preset display form through a video.

Optionally, in response to receiving an effect triggering operation for a target effect scene, the plurality of weather display elements are displayed in the target display area in the preset display form according to the first motion trajectory. That is, after the target effect scene is triggered, in response to the effect triggering operation, the weather display element is dynamically displayed in the target display area in the preset display form according to the first motion trajectory, such that a display effect of a meteorological element in the real environment may be shown.

In the embodiment, there may be various effect triggering operations for the target effect scene. For example, the effect triggering operation for the target effect scene may be to trigger a preset effect triggering control corresponding to the target effect scene; or input voice information including preset key information configured to start the target effect scene; or detect an operation of a user for opening a photographing apparatus; or recognize that a scene target element is displayed in the target display area; or collect a preset type of effect triggering information.

In the embodiment, the effect triggering control may be a physical key or a virtual key. The virtual key may be a key displayed on a display interface of application software. The effect triggering control may be configured on a target terminal for the target effect scene and/or a control device configured to control a target terminal. A display form of the effect triggering control may be at least one of preset images and characters. A triggering operation of the effect triggering control may be a clicking operation (such as single-click or double-click), a pressing operation (such as long-press or short-press), a sliding operation, or a hovering operation.

For example, the effect triggering information may be preset subject information such as a person, an animal, a building, or a tree, or may be action information such as a gesture, blinking, jumping, turning around, or turning.

S120. In response to detecting that the weather display element collides with the scene target element in the target display area, the weather display element is displayed in the target display area according to a second motion trajectory.

In the embodiment, the scene target element may be understood as an element to be detected about whether the element collides with the weather display element in the target display area. The scene target element may be an element that is displayed in the target display area and different from the weather display element. An image displayed in the target display area is detected according to a preset subject detection condition corresponding to the scene target element, such that the scene target element may be determined. The subject detection condition may be set according to actual needs. For example, the subject detection condition may include at least one of the following information: whether a type of the scene target element is a preset type, whether a picture proportion of the scene target element reaches a preset proportion, and whether the scene target element is a preset subject element.

In the embodiment, the preset types may include a type with life and a type without life, and may also be classified according to people, animals, plants, or buildings, etc. The preset subject elements may be human target parts, such as a head, a face, shoulders, and limbs. Alternatively, the preset subject elements may be local areas of target parts, such as a head, a cheek, a nose, and/or a mouth.

In the embodiment of the disclosure, the second motion trajectory is a motion trajectory of the weather display element after the weather display element collides with the scene target element. The second motion trajectory may be the same as or different from the first motion trajectory. For example, after the weather display element collides with the scene target element, only a motion velocity of the weather display element may be reduced, and the motion trajectory is not changed. That is, a motion velocity and a motion direction of the weather display element are changed, and further the motion trajectory of the weather display element is changed. The second motion trajectory may be determined according to collision information between the weather display element and the scene target element. For example, the second motion trajectory may be related to information of a target collision point colliding with the weather display element on the scene target element. The information of the target collision point may include velocity information and friction information of the target collision point.

It may be understood that a premise of detecting that the weather display element collides with the scene target element in the target display area is that the scene target element is displayed in the target display area. The scene target element may be an element that is displayed in the target display area and different from the weather display element. For example, the scene target element may be subject information such as a person, an animal, a building, and a tree.

Optionally, the scene target element is photographed based on a photographing apparatus, and the scene target element is displayed in the target display area. The photographing apparatus may be a photographing apparatus carried on a target terminal configured to display the scene target element, or another photographing apparatus. A method for photographing the scene target element based on the photographing apparatus may be to photograph the scene target element in real time by means of the photographing apparatus, or to pre-photograph the scene target element by means of the photographing apparatus. That is, the scene target element may be displayed in the target display area through real-time photographing, or the scene target element may be displayed in the target display area by displaying image information or video information of the pre-photographed scene target element.

S130. A weather display element that does not collide with the scene target element is continuously displayed in the target display area according to the first motion trajectory.

Considering that the weather display element that does not collide with the scene target element may exist, the weather display element that does not collide with the scene target element may be continuously displayed in the target display area according to the first motion trajectory. The setting has advantages that a real scene in which the weather display element does not collide with the scene target element can be simulated, naturalness of an effect can be ensured, and user experience can be improved.

In the embodiment, the weather display element is displayed in the target display area according to the first motion trajectory, such that the weather display element is dynamically displayed, and agility of the weather display element is enhanced. In response to detecting that the weather display element collides with the scene target element in the target display area, the weather display element is displayed in the target display area according to the second motion trajectory, such that interaction between the scene target element and the weather display element can be implemented, a problem that a display mode of an effect prop is fixed and lacks interaction with a user, which makes an overall display effect of a short video relatively simple can be solved, and image display can become more interesting. Moreover, the weather display element is displayed according to the second motion trajectory after collision, such that a collision effect can be made more realistic, an image display effect can be enriched, and user experience can be improved.

Embodiment 2

Figure 2:
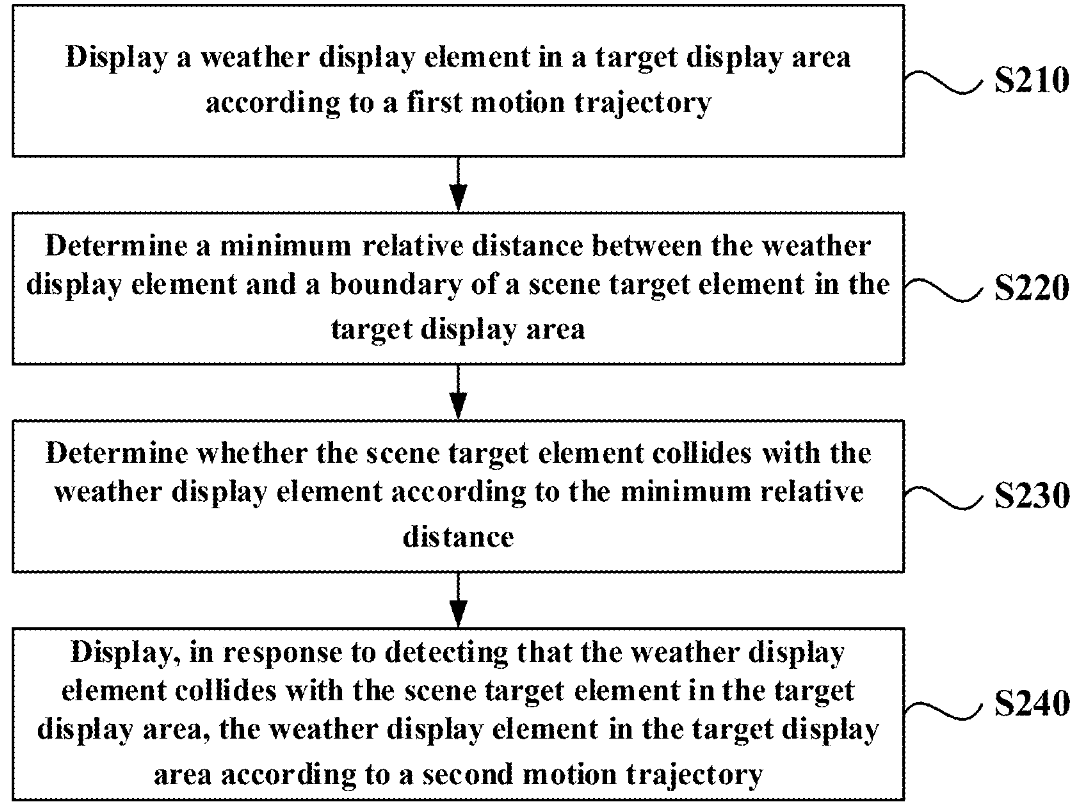
FIG. 2 is a schematic flow diagram of an element display method according to Embodiment 2 of the disclosure.

FIG. 2 is a schematic flow diagram of an element display method according to Embodiment 2 of the disclosure. Based on any one of optional embodiments in the embodiments of the disclosure, optionally, the element display method according to the embodiment of the disclosure further includes the following steps: a minimum relative distance between a weather display element and a boundary of a scene target element in a target display area is determined; and whether the scene target element collides with the weather display element is determined according to the minimum relative distance. Reference may be made to detailed description of the embodiment for a display mode. Technical terms the same as or corresponding to the above embodiment are not repeated herein.

As shown in FIG. 2, the method of the embodiment may include the following steps:

S210. A weather display element is displayed in a target display area according to a first motion trajectory.

S220. A minimum relative distance between the weather display element and a boundary of a scene target element in the target display area is determined.

In the embodiment, the minimum relative distance may be a smallest distance between the weather display element and the scene target element. Because the scene target element is displayed in the target display area, optionally, an image to be detected when the scene target element is displayed in the target display area may be obtained, contour information of the scene target element, which is the boundary of the scene target element, may be determined according to the image to be detected, and then a distance between each pixel point at the boundary of a scene element and the weather display element may be computed. A distance with the smallest value may be determined as the minimum relative distance between the weather display element and the boundary of the scene target element.

Considering that a plurality of weather display elements may exist in the image, a distance between each pixel point in the image except the scene target element and each pixel point at the boundary of the scene target element may be pre-determined for later query. Optionally, a signed distance field image corresponding to the image to be detected is determined according to the scene target element; and then the minimum relative distance between the weather display element and the boundary of the scene target element is determined according to the signed distance field image. The setting has advantages that no matter where the weather display element appears in the target display area, the minimum relative distance between the weather display element and the boundary of the scene target element in the target display area may be determined as soon as possible by querying a pixel value of the signed distance field image.

In the embodiment, the signed distance field image may be understood as a two-dimensional signed distance field, which is configured to represent a smallest distance between each point in the area and a boundary of an obstacle. In the embodiment of the disclosure, the scene target element may be used as an obstacle, or a area except the scene target element may be used as an obstacle. In this way, a smallest distance value corresponding to each pixel point in an entire image in the target display area may be computed.

In the embodiment of the disclosure, each smallest distance in the signed distance field image may be normalized.

S230. Whether the scene target element collides with the weather display element is determined according to the minimum relative distance.

For example, the minimum relative distance may be compared with a preset collision distance threshold. When the minimum relative distance is less than or equal to the collision distance threshold, it is determined that the scene target element collides with the weather display element. When the minimum relative distance is greater than the collision distance threshold, it is determined that the scene target element does not collide with the weather display element.

In the embodiment, the preset collision distance threshold may be set with reference to a normalized signed distance field image, or may be set according to an empirical value, and for example, may be set to be 0.5.

S240. In response to detecting that the weather display element collides with the scene target element in the target display area, the weather display element is displayed in the target display area according to a second motion trajectory.

In the embodiment, the minimum relative distance between the weather display element and the boundary of the scene target element in the target display area is determined, each pixel point at the boundary of the scene target element rather than all pixel points of the scene target element is detected, and then whether the scene target element collides with the weather display element is determined according to the minimum relative distance, which conforms to a real scene in which the weather display element collides with the scene target element and avoids unnecessary computation. In this way, computation efficiency is improved. Based on adding an interactive display scene of elements, an image display effect is improved.

Embodiment 3

Figure 3:
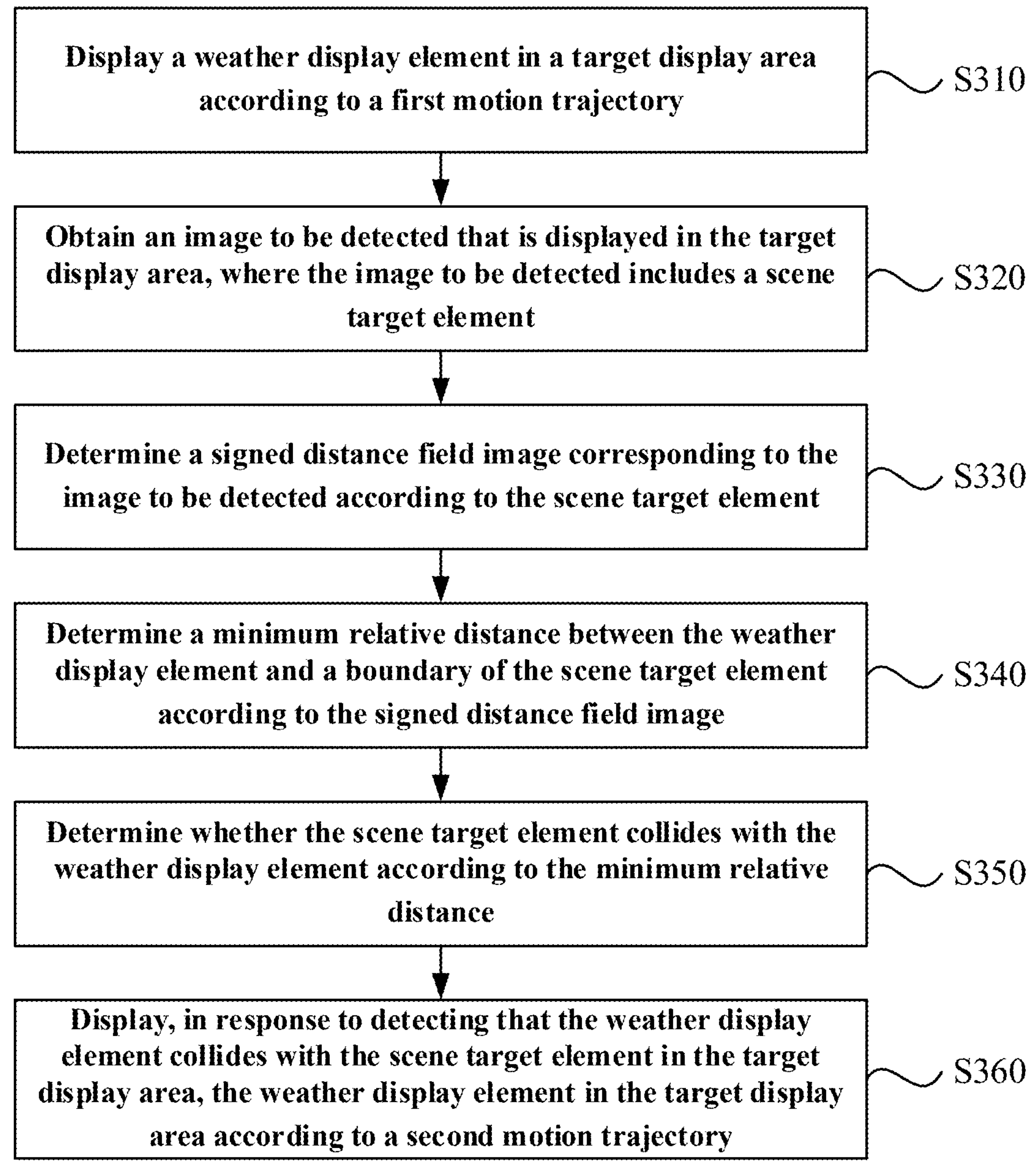
FIG. 3 is a schematic flow diagram of an element display method according to Embodiment 3 of the disclosure.

FIG. 3 is a schematic flow diagram of an element display method according to Embodiment 3 of the disclosure. Based on any one of optional embodiments in the embodiments of the disclosure, optionally, the step that the minimum relative distance between the weather display element and the boundary of the scene target element in the target display area is determined includes the following steps: an image to be detected that is displayed in the target display area is obtained, where the image to be detected includes the scene target element; a signed distance field image corresponding to the image to be detected is determined according to the scene target element; and the minimum relative distance between the weather display element and the boundary of the scene target element is determined according to the signed distance field image. Reference may be made to detailed description of the embodiment for a specific display mode. Technical terms the same as or corresponding to the above embodiment are not repeated herein.

As shown in FIG. 3, the method of the embodiment may include the following steps:

S310. A weather display element is displayed in a target display area according to a first motion trajectory.

S320. An image to be detected that is displayed in the target display area is obtained, where the image to be detected includes a scene target element.

In the embodiment, the image to be detected may be an image to be determined about whether the weather display element collides with the scene target element. Considering that a plurality of images may be displayed in the target display area, optionally, collision determination may not be conducted when the image to be detected includes no second display image. Therefore, an image, including the scene target element, displayed in the target display area may be obtained as the image to be detected.

Optionally, in response to detecting that the scene target element is displayed in the target area, an image displayed in the target display area is obtained, and the image obtained is used as the image to be detected.

S330. A signed distance field image corresponding to the image to be detected is determined according to the scene target element.

In the embodiment, a signed distance field (SDF) is a smallest distance between each point within an area and a boundary of a z obstacle. A two-dimensional SDF is generally represented by an image, which is a signed distance field image. In the embodiment of the disclosure, the scene target element is used as an obstacle, and a smallest distance between each pixel point in other areas except an area where a second element is located within an area of the image to be detected and a boundary of the scene target element may be computed, which is a smallest distance between each pixel point within an image area of the image to be detected of the signed distance field image in the embodiment of the disclosure and the boundary of the scene target element.

Optionally, a target mask image of the image to be detected may be determined according to the scene target element; and then the signed distance field image corresponding to the image to be detected may be determined according to the target mask image.

Optionally, the step that the target mask image of the image to be detected is determined according to the scene target element may include the following steps: a matting processing is performed on the scene target element of the image to be detected to obtain an initial mask image corresponding to the scene target element; and a binarization processing is performed on the initial mask image according to a preset pixel value threshold to obtain the target mask image of the image to be detected.

For example, a foreground image of the image to be detected is obtained with a matting algorithm, and then an area including the scene target element is cut out, such that an initial mask image may be obtained, which is a mask image. A pixel value of each pixel point in the mask image is between 0 and 255. Then, a pixel value of a pixel point having a pixel value greater than or equal to the preset pixel value threshold is set to be 255, and a pixel value of a pixel point having a pixel value less than the preset pixel value threshold is set to be 0, such that a binary image (in which a pixel value of each pixel point is 0 or 255) may be obtained, which is the target mask image of the image to be detected. Further, a smallest distance corresponding to each pixel point is determined according to a black area and a white area in the target mask image to obtain the signed distance field image corresponding to the image to be detected.

S340. The minimum relative distance between the weather display element and the boundary of the scene target element is determined according to the signed distance field image.

It may be seen from the above description that a value of each pixel point in the signed distance field image is a smallest distance between the pixel point and the boundary of the scene target element, such that the minimum relative distance between the weather display element and the boundary of the scene target element is a value of a pixel point in the signed distance field image corresponding to the weather display element.

Optionally, first position information of the weather display element in the image to be detected is determined; and a target pixel point in the signed distance field image corresponding to the first position information is determined, and a pixel distance value corresponding to the target pixel point is used as the minimum relative distance between the weather display element and the boundary of the scene target element. The pixel distance value is a pixel value of the target pixel point in the signed distance field image.

S350. Whether the scene target element collides with the weather display element is determined according to the minimum relative distance.

S360. In response to detecting that the weather display element collides with the scene target element in the target display area, the weather display element is displayed in the target display area according to a second motion trajectory.

In the embodiment, the image to be detected that is displayed in the target display area is obtained, for each image to be detected, the signed distance field image corresponding to the image to be detected is determined according to the scene target element, a smallest distance between each pixel point and each pixel point at the boundary of the scene target element is pre-computed, and then the minimum relative distance between the weather display element and the boundary of the scene target element is determined according to the signed distance field image. The minimum relative distance between the weather display element and the boundary of the scene target element can be quickly determined, which is particularly suitable for a case of parallel processing of a plurality of scene target elements. Computation efficiency can be improved, and a processed image effect can be quickly shown.

Embodiment 4

Figure 4:
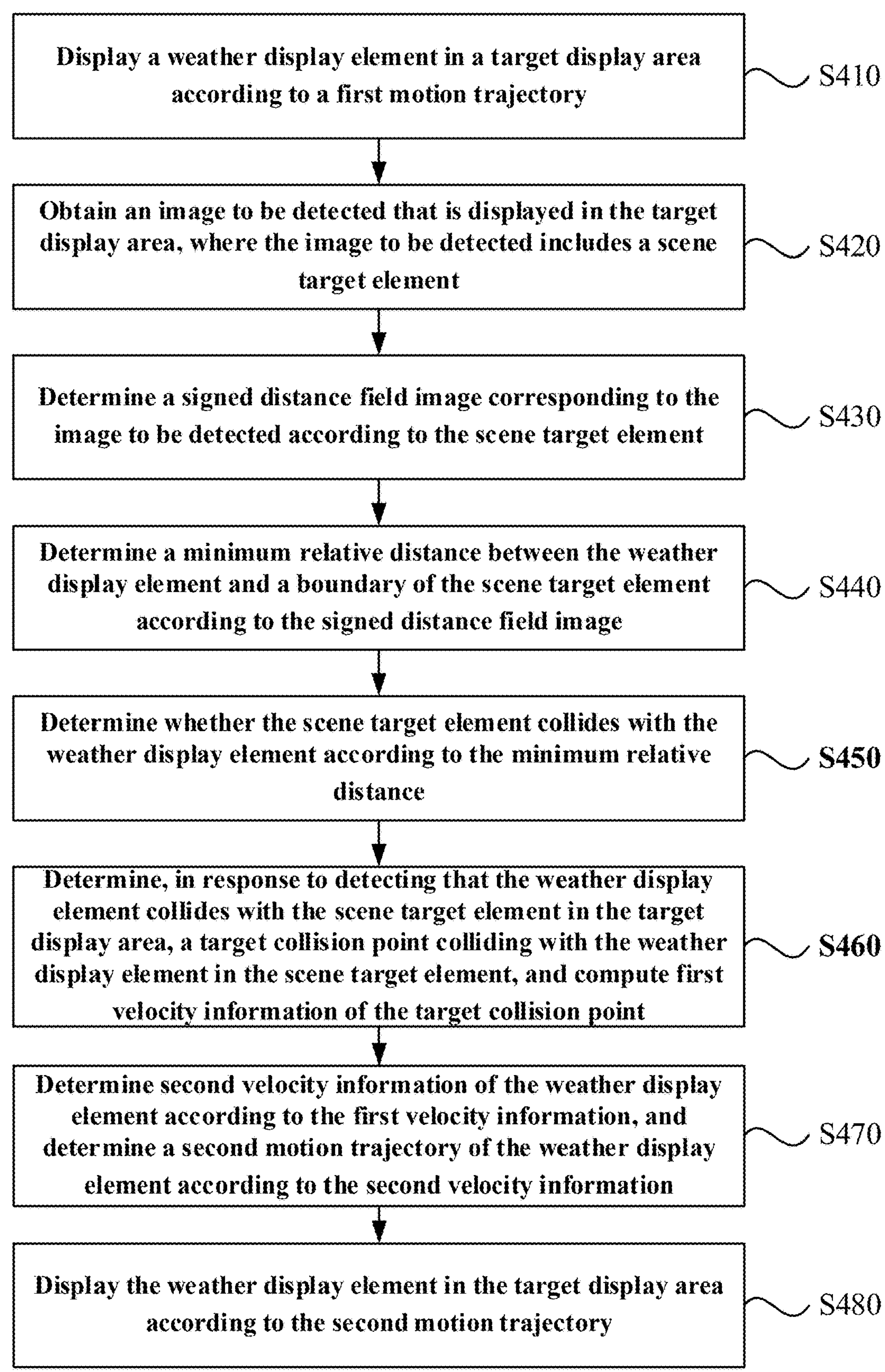
FIG. 4 is a schematic flow diagram of an element display method according to Embodiment 4 of the disclosure.

FIG. 4 is a schematic flow diagram of an element display method according to Embodiment 4 of the disclosure. Based on any one of optional embodiments in the embodiments of the disclosure, optionally, after it is detected that a weather display element collides with a scene target element in a target display area and before the weather display element is displayed in the target display area according to a second motion trajectory, the method further includes the following steps: a target collision point in the scene target element colliding with the weather display element is determined, and first velocity information of the target collision point is computed; and second velocity information of the weather display element is determined according to the first velocity information, and the second motion trajectory of the weather display element is determined according to the second velocity information. Reference may be made to detailed description of the embodiment for a specific display mode. Technical terms the same as or corresponding to the above embodiment are not repeated herein.

As shown in FIG. 4, the method of the embodiment may include the following steps:

S410. A weather display element is displayed in a target display area according to a first motion trajectory.

S420. An image to be detected that is displayed in the target display area is obtained, where the image to be detected includes a scene target element.

S430. A signed distance field image corresponding to the image to be detected is determined according to the scene target element.

S440. A minimum relative distance between the weather display element and a boundary of the scene target element is determined according to the signed distance field image.

S450. Whether the scene target element collides with the weather display element is determined according to the minimum relative distance.

S460. In response to detecting that the weather display element collides with the scene target element in the target display area, a target collision point in the scene target element colliding with the weather display element is determined, and first velocity information of the target collision point is computed.

In the embodiment, the target collision point is a boundary point having the minimum relative distance between the boundary of the scene target element and the weather display element. It may be seen from the above description that a value given to each pixel point in the signed distance field image represents a smallest distance between the pixel point and the boundary of the scene target element, which is the pixel distance value mentioned above. A pixel point at the boundary of the scene target element corresponding to the pixel distance value is the target collision point.

Optionally, the step that the first velocity information of the target collision point is computed includes the following steps: current position information of the target collision point in the image to be detected and last position information of the target collision point in a last image adjacent to display time of the image to be detected in the target display area are determined; and the first velocity information of the target collision point is determined according to the current position information, the last position information, and a preset simulation time step size. The preset simulation time step size is a preset time variation amount between the image to be detected and the last image.

In the embodiment of the disclosure, the current position information of the target collision point in the image to be detected may be determined according to first position information of the weather display element. Optionally, the first position information of the weather display element may be determined, and a unit normal vector of the boundary of the scene target element at the target collision point may be computed according to the first position information; and the current position information of the target collision point in the image to be detected may be determined according to the first position information, the minimum relative distance, the unit normal vector, and a preset collision distance threshold.

Optionally, the step that the unit normal vector of the boundary of the scene target element at the target collision point is computed according to the first position information includes the following steps: two first reference pixel points adjacent to a pixel point corresponding to the weather display element in a first preset direction and two second reference pixel points adjacent to a pixel point corresponding to the weather display element in a second preset direction are determined, where the first preset direction is perpendicular to the second preset direction; a first difference between pixel distance values corresponding to the two first reference pixel points in the signed distance field image and a second difference between pixel distance values corresponding to the two second reference pixel points in the signed distance field image are computed; and the unit normal vector of the boundary of the scene target element at the target collision point is determined according to the first difference and the second difference.

n(x, y) represents the unit normal vector of the boundary of the scene target element at the target collision point. (x+dx, y) and (x−dx, y) are the two first reference pixel points adjacent to the pixel point corresponding to the weather display element (x, y) in the first preset direction x, respectively. (x, y+dy) and (x, y−dy) are the two second reference pixel points adjacent to the pixel point corresponding to the weather display element (x, y) in the second preset direction y, respectively. sdf(x+dx, y) is the pixel distance value corresponding to the first reference pixel point (x+dx, y) in the signed distance field image. sdf(x−dx, y) is the pixel distance value corresponding to the first reference pixel point (x−dx, y) in the signed distance field image. sdf(x, y+dy) is the pixel distance value corresponding to the second reference pixel point (x, y+dy) in the signed distance field image. sdf(x, y−dy) is the pixel distance value corresponding to the second reference pixel point (x, y−dy) in the signed distance field image. For example, the unit normal vector n(x, y) may be computed through the following formula:

$$\text{normal vector } N(x, y) = vec2(sdf(x+dx, y) - sdf(x-dx, y), sdf(x, y+dy) - sdf(x, y-dy))$$

$$\text{unit normal vector } n(x, y) = N(x, y)/\text{length}(N(x, y))$$

dx represents a position offset of two adjacent pixel points in the direction x, and dy represents a position offset of two adjacent pixel points in the direction y. In an embodiment of the disclosure, dx may be a reciprocal of a width of an SDF image, and dy may be a reciprocal of a height of the SDF image. For example, if a size of the SDF image is 360 (width)*640 (height), dx=1/360, and dy=1/640.

Optionally, the step that the current position information of the target collision point in the image to be detected is determined according to the first position information, the minimum relative distance, the unit normal vector, and the preset collision distance threshold may be implemented as follows: a distance difference between the preset collision distance threshold and the minimum relative distance sdf(x, y) is computed, and a product obtained by multiplying the distance difference by the unit normal vector n(x, y) and the first position information (x, y) are added, such that the current position information of the target collision point in the image to be detected is obtained.

For example, if the preset collision distance threshold is 0.5, a computation method for the current position information of the target collision point in the image to be detected is (x, y)+(0.5−sdf(x, y))*n(x, y).

Similarly, the last position information of the target collision point in the last image having the adjacent display time to the image to be detected in the target display area may be computed, and then the first velocity information of the target collision point may be determined according to the current position information, the last position information, and the preset simulation time step size. The preset simulation time step size is the preset time variation amount between the image to be detected and the last image.

Optionally, information of a boundary position (that is, a current position of the target collision point) of the scene target element closest to particle p in a current image is (x, y)+(0.5−sdf_current(x, y))*n_current(x, y), and information of a boundary position (that is, a last position of the target collision point) of the scene target element closest to particle p in a last image is (x, y)+(0.5−sdf_last(x, y))*n_last(x, y), where sdf_current(x, y) represents a smallest distance corresponding to a position (x, y) of the current image in the SDF image, n_current(x, y) represents a unit normal vector of a boundary of a scene target element in the current image at the target collision point, sdf_last(x, y) represents a smallest distance corresponding to a position (x, y) of the last image in the SDF image, and n_last(x, y) represents a unit normal vector of a boundary of a scene target element in the last image at the target collision point.

Therefore, the first velocity information v_collider of the target collision point is obtained by subtracting position information in the last image from position information of the target collision point in the current image and then dividing a result by a preset simulation time step size dt, that is, v_collider={(0.5−sdf_current(x, y))*n_current(x, y)−(0.5−sdf_last(x, y))*n_last(x, y)}/dt.

S470, second velocity information of the weather display element is determined according to the first velocity information, and the second motion trajectory of the weather display element is determined according to the second velocity information.

In the embodiment of the disclosure, the first velocity information of the target collision point may influence motion of the weather display element after collision. Therefore, the second velocity information of the weather display element may be determined according to the first velocity information and initial velocity information of the weather display element at a collision moment.

Optionally, initial relative velocity information of the weather display element relative to the target collision point is determined according to the first velocity information and the initial velocity information of the weather display element at the collision moment. A normal projection velocity component of the initial relative velocity information in a direction of the unit normal vector is computed, and the second velocity information of the weather display element is determined according to the normal projection velocity component.

In the embodiment, the initial velocity information may be understood as velocity information of the weather display element before collision, which is an initial motion velocity of the weather display element when the weather display element moves along the first motion trajectory. It should be noted that the velocity information of the embodiment of the disclosure may include a velocity magnitude and a velocity direction.

Optionally, a velocity difference between the initial velocity information v_snow of the weather display element at the collision moment and the first velocity information v_collider of the target collision point is computed, such that the initial relative velocity information v_rel of the weather display element relative to the target collision point is obtained, that is, v_rel=v_snow−v_collider. Further, the normal projection velocity component v_n is obtained by dot multiplying the initial relative velocity information by the unit normal vector, that is, v_n=dot(v_rel, normal), where normal represents the unit normal vector, which may be obtained by normalizing n(x, y) in the above description.

Optionally, the step that the second velocity information of the weather display element is determined according to the normal projection velocity component may include the following steps: in response to determining that the normal projection velocity component is less than a first preset normal component threshold, a tangential projection velocity component of the initial relative velocity information in a direction of a tangent vector corresponding to the target collision point is computed, where the tangent vector is perpendicular to the unit normal vector; target relative velocity information of the weather display element relative to the target collision point is determined according to the tangential projection velocity component; and the second velocity information of the weather display element is determined according to the first velocity information and the target relative velocity information.

In the embodiment, the first preset normal component threshold may be preset according to experience. In the embodiment of the disclosure, a value of the first preset normal component threshold may be 0. When the normal projection velocity component v_n is less than 0, a tangential projection velocity component v_tangent of the initial relative velocity information in a direction of the tangent vector perpendicular to the unit normal vector is computed. For example, v_tangent=v_rel−v_n*norma. Optionally, a magnitude of the tangential projection velocity component of the initial relative velocity information in the direction of the tangent vector is v_tan_len=length(v_tangent), where length represents a length of the tangential projection velocity component.

Optionally, the step that the target relative velocity information of the weather display element relative to the target collision point is determined according to the tangential projection velocity component includes the following steps: a static friction critical velocity at the target collision point is determined, where the static friction critical velocity is determined according to the normal projection velocity component and a preset static friction coefficient corresponding to the target collision point; and the target relative velocity information is determined to be 0 in response to determining that the tangential projection velocity component is less than or equal to the static friction critical velocity.

In the embodiment, the step that the static friction critical velocity at the target collision point is determined as follows: a product of the static friction coefficient and the normal projection velocity component is computed, and the static friction critical velocity is obtained. The static friction coefficient is generally set to be any value between 0 and 1. When the tangential projection velocity component is less than or equal to the static friction critical velocity, no relative motion occurs between the weather display element and the scene target element. In this case, the first velocity information of the target collision point is the second velocity information of the scene target element.

Based on the optional embodiment, optionally, in response to determining that the tangential projection velocity component is greater than the static friction critical velocity, the target relative velocity information of the weather display element relative to the target collision point is determined according to the normal projection velocity component, the tangential projection velocity component, and the static friction coefficient.

For example, in response to determining that the tangential projection velocity component is greater than the static friction critical velocity, the target relative velocity information of the weather display element relative to the target collision point may be determined based on the following formula:

$$v\_rel=(1+friction\_coef*v\_n/v\_tan\_len)*v\_tangent$$

v_rel represents the target relative velocity information of the weather display element relative to the target collision point, friction_coef represents the static friction coefficient, v_n represents the normal projection velocity component, v_tangent represents the tangential projection velocity component, and v_tan_len represents the length of the tangential projection velocity component.

Optionally, the second velocity information may be determined based on the formula: vel=v_rel+v_collider, where v_rel is the target relative velocity information of the weather display element relative to the target collision point, and v_collider is the first velocity information of the target collision point.

Based on the embodiment, optionally, in response to determining that the normal projection velocity component is greater than a second preset normal component threshold, the second velocity information of the weather display element is determined according to the first velocity information and the initial relative velocity information. Optionally, the sum of the first velocity information and the initial relative velocity information is obtained, such that the second velocity information of the weather display element may be obtained.

In the embodiment, the second preset normal component threshold may be the same as or different from the first preset normal component threshold. For example, a value of the second preset normal component threshold may also be 0.

In the embodiment, after the second velocity information of each weather display element is determined, the second velocity information may be fed back to an MPM framework, such that the MPM framework may determine display information of the scene target element according to the returned second velocity information and a preset position determination function. Optionally, position information and velocity information of the scene target element in a next image may be determined according to the second velocity information and the preset position determination function. Further, through reusage of the element display method according to the embodiment of the disclosure, each subsequent position of the weather display element may be determined according to the second velocity information, and then a motion trajectory of the weather display element may be determined as the second motion trajectory.

S480. The weather display element is displayed in the target display area according to the second motion trajectory.

In the embodiment, the boundary point having the minimum relative distance between the boundary of the scene target element and the weather display element is used as the target collision point, point-to-point refinement processing is implemented during collision, the first velocity information of the target collision point is computed, and the second velocity information of the weather display element is determined according to the first velocity information. A real collision scene is simulated from a physical point of view, interaction between the weather display element and the scene target element is fully considered, and further the second motion trajectory of the weather display element is determined according to the second velocity information, such that a collision result is better shown, an image display effect is made more realistic, immersive experience is provided for a user, and customer stickiness is enhanced advantageously.

Embodiment 5

Figure 5:
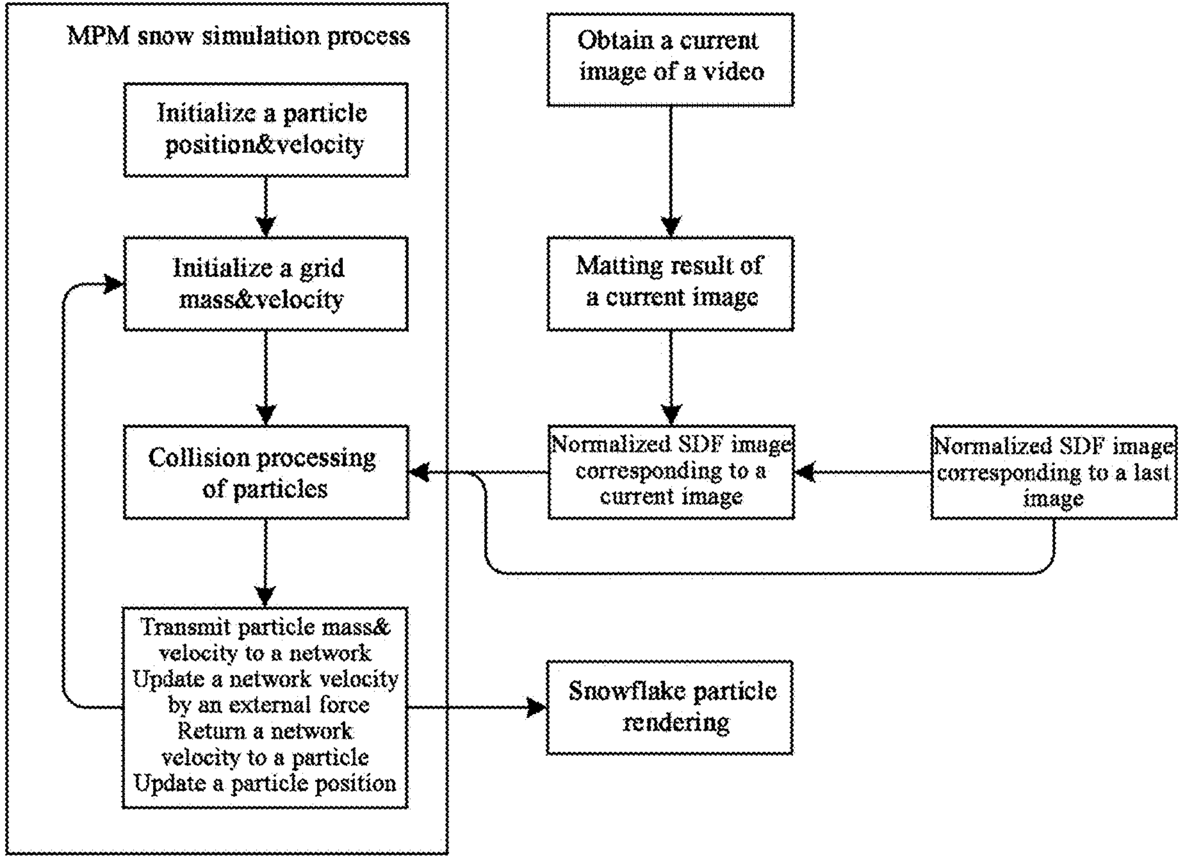
FIG. 5 is a schematic flow diagram of an optional instance of an element display method according to Embodiment 5 of the disclosure.
Figure 6:
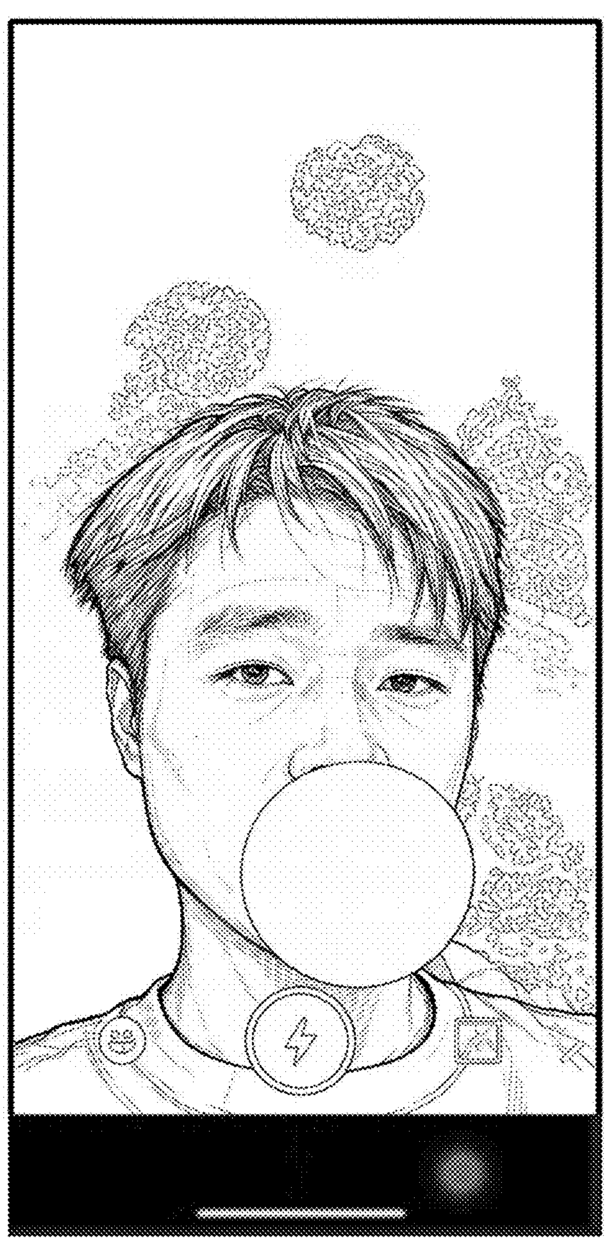
FIG. 6 is a schematic diagram showing a snow collision effect of a human body based on the element display method according to an embodiment of the disclosure.

FIG. 5 is a schematic flow diagram of an optional instance of an element display method according to Embodiment 5 of the disclosure. As an optional instance of the above embodiment, assuming that a weather display element is a snowflake particle and a plurality of snowflake particles are displayed in a form of a snow ball, a first motion trajectory is a free-fall trajectory, and a scene target element is a human body area. For snowflake particles, a computational shader may be deployed in a mobile terminal for element display or deployed in a server supporting element display in a mobile terminal, and a snow simulation effect created through MPM may be achieved based on the computational shader. A target effect scene is finally shown as a snow collision effect of a human body. As shown in FIG. 6, a snow ball falls from a top of a screen, and when the snow ball collides with a human body, the snowflake particles may change with collision of the human body, such that the snowflake particles may interact with a user.

Optionally, in response to receiving an effect triggering operation input by the user for a preset snow collision effect, an effect prop is enabled, and the snow ball is displayed in a target display area in the mobile terminal. An image including the human body area is collected, a current image to be detected in a video image is obtained, a foreground image of the image to be detected is obtained through a matting algorithm, and then an area including a scene target element is cut out, such that an initial mask image may be obtained, which is a mask image. A pixel value of each pixel point in the mask image is between 0 and 255. Then, a pixel value of a pixel point having a pixel value greater than or equal to the preset pixel value threshold is set to be 255, and a pixel value of a pixel point having a pixel value less than the preset pixel value threshold is set to be 0, such that a binary image (in which a pixel value of each pixel point is 0 or 255) may be obtained, which is the target mask image of the image to be detected. Further, a smallest distance corresponding to each pixel point is determined according to a black area and a white area in the target mask image, and a signed distance field having a known smallest distance corresponding to each pixel point is obtained, which is an SDF image corresponding to the image to be detected.

In an embodiment, the SDF image stores position information of a closest obstacle at a position corresponding to each pixel point, and then transmits information. For a point outside the obstacle, a position of a point inside the closest obstacle is computed. For a point inside the obstacle, a position of a point outside the closest obstacle is computed. Two problems are dual and may be solved in the same way. How to compute the position of the point inside the closest obstacle for the point outside the obstacle will be introduced below. In the embodiment of the disclosure, the scene target element may be used as an obstacle, or an area except the human body area may be used as an obstacle. In this way, a smallest distance value corresponding to each pixel point in an entire image in the target display area may be computed. Optionally, each smallest distance in the signed distance field image may be normalized.

A collision processing process for each snowflake particle may be as follows:

Firstly, whether the snowflake particle collides with the human body area is determined. Assuming that a position of a snowflake particle p is (x, y), sdf(x, y) represents an sdf value (which is between 0 and 1 after normalization) at the position of the snowflake particle p, and a preset collision distance threshold is 0.5. When $sdf(x, y)<0.5$, it is determined that the particle p collides with an obstacle. When no collision occurs between the human body area and the snowflake particle, a snowflake particle that does not collide with the human body area is continuously displayed in the target display area according to the first motion trajectory.

Secondly, for the snowflake particle that collides with the human body area, a boundary point of the human body area closest to the snowflake particle is used as a target collision point. A velocity and a position of the target collision point need to be computed.

For example, first velocity information of the target collision point where the human body area collides with the snowflake particle is computed as follows: assuming that the target collision point closest to the snowflake particle is not changed in a current image (an image to be detected) and a last image (a last image before the image to be detected), a velocity of the target collision point may be obtained by subtracting a position of the target collision point in the last image from a position of the target collision point in the current image and then dividing a result by a simulation time step size. The simulation time step size dt refers to a simulation time step size in each image. For example, for 30 frames per second (fps), a time step size is 1/30 s, which is about 33 ms.

Optionally, the position of the target collision point may be computed as follows:

Firstly, a unit normal vector of a boundary of the human body area at the target collision point is computed according to first position information, where n(x, y) represents the unit normal vector of the boundary of the human body area at the target collision point, (x+dx, y) and (x−dx, y) are two first reference pixel points adjacent to a pixel point corresponding to a snowflake particle (x, y) in a first preset direction x, respectively, (x, y+dy) and (x, y−dy) are two second reference pixel points adjacent to the pixel point corresponding to the snowflake particle (x, y) in a second preset direction y, respectively, sdf(x+dx, y) is a pixel distance value corresponding to the first reference pixel point (x+dx, y) in an SDF image, sdf(x−dx, y) is a pixel distance value corresponding to the first reference pixel point (x−dx, y) in the SDF image, sdf(x, y+dy) is a pixel distance value corresponding to the second reference pixel point (x, y+dy) in the SDF image, and sdf(x, y−dy) is a pixel distance value corresponding to the second reference pixel point (x, y−dy) in the SDF image. For example, the unit normal vector n(x, y) may be computed through the following formula:

$$\text{normal vector } N(x, y) = vec2(sdf(x+dx, y) - sdf(x-dx, y), sdf(x, y+dy) - sdf(x, y-dy))$$

$$\text{unit normal vector } n(x, y) = N(x, y)/\text{length}(N(x, y))$$

dx represents a position offset of two adjacent pixel points in the direction x, and dy represents a position offset of two adjacent pixel points in the direction y. In an embodiment of the disclosure, dx may be a reciprocal of a width of the SDF image, and dy may be a reciprocal of a height of the SDF image. For example, if a size of the SDF image is 360 (width)*640 (height), dx=1/360, and dy=1/640.

Secondly, a distance difference between the preset collision distance threshold and the minimum relative distance sdf(x, y) is computed, and a product obtained by multiplying the distance difference by the unit normal vector n(x, y) and the first position information (x, y) are added, such that current position information of the target collision point in the image to be detected is obtained. For example, if the preset collision distance threshold is 0.5, a computation method for the current position information of the target collision point in the image to be detected is (x, y)+(0.5−sdf(x, y))*n(x, y).

Optionally, a boundary position (that is, a current position of the target collision point) information of the human body area closest to particle p in a current image is (x, y)+(0.5−sdf_current(x, y))*n_current(x, y), and a boundary position (that is, a last position of the target collision point) information of the human body area closest to particle p in a last image is (x, y)+(0.5−sdf_last(x, y))*n_last(x, y), where sdf_current(x, y) represents a smallest distance corresponding to a position (x, y) of the current image in the SDF image, n_current(x, y) represents a unit normal vector of a boundary of a human body area in the current image at the target collision point, sdf_last(x, y) represents a smallest distance corresponding to a position (x, y) of the last image in the SDF image, and n_last(x, y) represents a unit normal vector of a boundary of a human body area in the last image at the target collision point.

Therefore, the first velocity information v_collider of the target collision point is obtained by subtracting position information in the last image from position information of the target collision point in the current image and dividing a result by a preset simulation time step size dt, that is, v_collider={(0.5−sdf_current(x, y))*n_current(x, y)−(0.5−sdf_last(x, y))*n_last(x, y)}/dt.

Thirdly, second velocity information vel of the snowflake particle is determined according to velocity information v_collider of the target collision point, and a computation process is as follows:

A velocity difference between initial velocity information v_snow of the snowflake particle at a collision moment and the first velocity information v_collider of the target collision point is computed, such that initial relative velocity information v_rel of the snowflake particle relative to the target collision point is obtained, that is, v_rel=v_snow−v_collider. Further, a normal projection velocity component v_n is obtained by dot multiplying an initial relative velocity information by the unit normal vector, that is, v_n=dot (v_rel, normal), where normal represents the unit normal vector, which may be obtained by normalizing n(x, y) in the above description.

Assuming that values of a first preset normal component threshold and a second preset normal component threshold are both 0, when the normal projection velocity component v_n is smaller than 0, a tangential projection velocity component v_tangent of the initial relative velocity information in a direction of a tangent vector perpendicular to the unit normal vector. For example, v_tangent=v_rel−v_n*norma. Optionally, a magnitude of the tangential projection velocity component of the initial relative velocity information in the direction of the tangent vector is v_tan_len=length(v_tangent), where length represents a length of the tangential projection velocity component.

For example, in response to determining that the tangential projection velocity component is greater than a static friction critical velocity, the target relative velocity information of the snowflake particle relative to the target collision point may be determined based on the following formula:

$$\text{v\_rel} = (1 + \text{friction\_coef} * \text{v\_n}/\text{v\_tan\_len}) * \text{v\_tangent}$$

v_rel represents the target relative velocity information of the snowflake particle relative to the target collision point, friction_coef represents the static friction coefficient, v_n represents the normal projection velocity component, v_tangent represents the tangential projection velocity component, and v_tan_len represents a length of the tangential projection velocity component. The static friction coefficient is generally set to be any value between 0 and 1.

Finally, the second velocity information is determined based on the formula: vel=v_rel+v_collider, such that the snowflake particle plans a second motion trajectory according to the second velocity information and is displayed according to the second motion trajectory.

In the embodiment, an effect scene in which a human body collides with snow is provided, a real snow collision scene is simulated, and the snowflake particles are refined and then rendered, such that an image display effect is improved, user experience is improved, and customer stickiness is enhanced advantageously.

Embodiment 6

Figure 7:
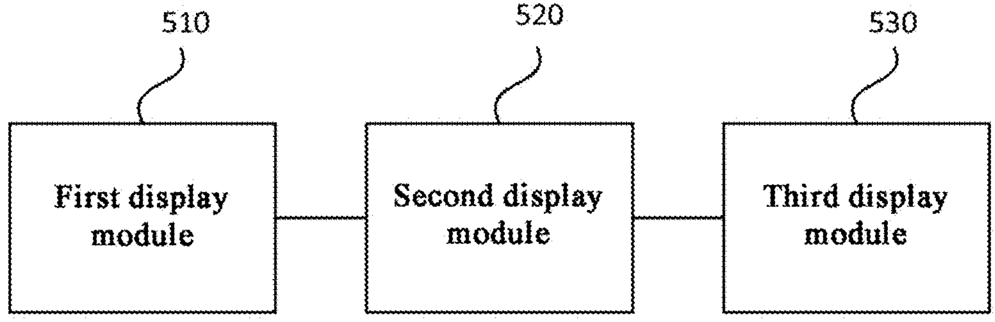
FIG. 7 is a schematic structural diagram of an apparatus display method according to Embodiment 1 of the disclosure.

FIG. 7 is a schematic structural diagram of an apparatus display method according to Embodiment 5 of the disclosure. The apparatus display method according to the embodiment may be implemented by means of software and/or hardware, and may be configured in a terminal and/or a server, so as to implement the element display method according to the embodiment of the disclosure. The apparatus may specifically include a first display module 510, a second display module 520, and a third display module 530.

The first display module 510 is configured to display a weather display element in a target display area according to a first motion trajectory. The second display module 520 is configured to display, in response to detecting that the weather display element collides with a scene target element in the target display area, the weather display element in the target display area according to a second motion trajectory. The third display module 530 is configured to continuously display a weather display element that does not collide with the scene target element in the target display area according to the first motion trajectory.

In the embodiment, the weather display element is displayed in the target display area according to the first motion trajectory, such that the weather display element is dynamically displayed, and agility of the weather display element is enhanced. In response to detecting that the weather display element collides with the scene target element in the target display area, the weather display element is displayed in the target display area according to the second motion trajectory, such that interaction between the scene target element and the weather display element can be implemented, a problem that a display mode of an effect prop is fixed and lacks interaction with a user, which makes an overall display effect of a short video relatively simple can be solved, and image display can become more interesting. Moreover, the weather display element is displayed according to the second motion trajectory after collision, such that a collision effect can be made more realistic, an image display effect can be enriched, and user experience can be improved.

Based on the embodiment of the disclosure, optionally, the first display module is configured to: display, in response to receiving an effect triggering operation for a target effect scene, a plurality of weather display elements in the target display area in a preset display form according to the first motion trajectory.

Based on the embodiment of the disclosure, optionally, the apparatus display method further includes: an element photographing module configured to photograph the scene target element based on a photographing apparatus to display the scene target element in the target display area.

Based on the embodiment of the disclosure, optionally, the apparatus display method further includes: a minimum relative distance determination module configured to determine a minimum relative distance between the weather display element and a boundary of the scene target element in the target display area; and a collision determination module configured to determine whether the scene target element collides with the weather display element according to the minimum relative distance.

Based on the embodiment of the disclosure, optionally, the minimum relative distance determination module includes a to-be-detected image obtaining unit, a signed distance field image determination unit, and a minimum relative distance determination unit.

The to-be-detected image obtaining unit is configured to obtain an image to be detected that is displayed in the target display area. The image to be detected includes the scene target element. The signed distance field image determination unit is configured to determine a signed distance field image corresponding to the image to be detected according to the scene target element. The minimum relative distance determination unit is configured to determine the minimum relative distance between the weather display element and the boundary of the scene target element according to the signed distance field image.

Based on the embodiment of the disclosure, optionally, the signed distance field image determination unit includes: a target mask image determination sub-unit and a signed distance field image determination sub-unit.

The target mask image determination sub-unit is configured to determine a target mask image of the image to be detected according to the scene target element. The signed distance field image determination sub-unit is configured to determine the signed distance field image corresponding to the image to be detected according to the target mask image.

Based on the embodiment of the disclosure, optionally, the target mask image determination sub-unit is configured to: perform a matting processing on the scene target element of the image to be detected to obtain an initial mask image corresponding to the scene target element; and perform a binarization processing on the initial mask image according to a preset pixel value threshold to obtain the target mask image of the image to be detected.

Based on the embodiment of the disclosure, optionally, the minimum relative distance determination unit is configured to: determine first position information of the weather display element in the image to be detected; and determine a target pixel point corresponding to the first position information in the signed distance field image, and use a pixel distance value corresponding to the target pixel point as the minimum relative distance between the weather display element and the boundary of the scene target element.

Based on the embodiment of the disclosure, optionally, the apparatus display method further includes: a first velocity information determination module and a second motion trajectory determination module.

The first velocity information determination module is configured to determine, after it is detected that the weather display element collides with the scene target element in the target display area and before the weather display element is displayed in the target display area according to the second motion trajectory, a target collision point in the scene target element colliding with the weather display element, and compute first velocity information of the target collision point. The second motion trajectory determination module is configured to determine second velocity information of the weather display element according to the first velocity information, and determine the second motion trajectory of the weather display element according to the second velocity information.

Based on the embodiment of the disclosure, optionally, the first velocity information determination module includes a position information determination unit and a first velocity computation unit.

The position information determination unit is configured to determine current position information of the target collision point in the image to be detected and last position information of the target collision point in a last image adjacent to display time of the image to be detected in the target display area. The first velocity computation unit is configured to determine the first velocity information of the target collision point according to the current position information, the last position information, and a preset simulation time step size. The preset simulation time step size is a preset time variation amount between the image to be detected and the last image.

Based on the embodiment of the disclosure, optionally, the position information determination unit includes a unit normal vector determination sub-unit and a current position information determination sub-unit.

The unit normal vector determination sub-unit is configured to determine first position information of the weather display element, and compute a unit normal vector of the boundary of the scene target element at the target collision point according to the first position information. The current position information determination sub-unit is configured to determine the current position information of the target collision point in the image to be detected according to the first position information, the minimum relative distance, the unit normal vector, and a preset collision distance threshold.

Based on the embodiment of the disclosure, optionally, the unit normal vector determination sub-unit is configured to: determine two first reference pixel points adjacent to a pixel point corresponding to the weather display element in a first preset direction and determine two second reference pixel points adjacent to a pixel point corresponding to the weather display element in a second preset direction, where the first preset direction is perpendicular to the second preset direction; compute a first difference between pixel distance values corresponding to the two first reference pixel points in the signed distance field image and a second difference between pixel distance values corresponding to the two second reference pixel points in the signed distance field image; and determine the unit normal vector of the boundary of the scene target element at the target collision point according to the first difference and the second difference.

Based on the embodiment of the disclosure, optionally, the second motion trajectory determination module includes: an initial relative velocity determination unit configured to determine initial relative velocity information of the weather display element relative to the target collision point according to the first velocity information and initial velocity information of the weather display element at a collision moment; and a second velocity information determination unit configured to compute a normal projection velocity component of the initial relative velocity information in a direction of the unit normal vector, and determine the second velocity information of the weather display element according to the normal projection velocity component.

Based on the embodiment of the disclosure, optionally, the second velocity information determination unit includes: a tangential projection velocity component determination sub-unit configured to compute, in response to determining that the normal projection velocity component is less than a first preset normal component threshold, a tangential projection velocity component of the initial relative velocity information in a direction of a tangent vector corresponding to the target collision point, where the tangent vector is perpendicular to the unit normal vector; a target relative velocity information determination sub-unit configured to determine target relative velocity information of the weather display element relative to the target collision point according to the tangential projection velocity component; and a second velocity information determination sub-unit configured to determine the second velocity information of the weather display element according to the first velocity information and the target relative velocity information.

Based on the embodiment of the disclosure, optionally, the target relative velocity information determination sub-unit is configured to: determine a static friction critical velocity at the target collision point, where the static friction critical velocity is determined according to the normal projection velocity component and a preset static friction coefficient corresponding to the target collision point; and determine, in response to determining that the tangential projection velocity component is less than or equal to the static friction critical velocity, the target relative velocity information to be 0.

Based on the embodiment of the disclosure, optionally, the target relative velocity information determination sub-unit is further configured to: determine, in response to determining that the tangential projection velocity component is greater than the static friction critical velocity, the target relative velocity information of the weather display element relative to the target collision point according to the normal projection velocity component, the tangential projection velocity component, and the static friction coefficient.

Based on the embodiment of the disclosure, optionally, the second velocity information determination unit is configured to: determine, in response to determining that the normal projection velocity component is greater than a second preset normal component threshold, the second velocity information of the weather display element according to the first velocity information and the initial relative velocity information.

Based on the embodiment of the disclosure, optionally, the weather display element includes a meteorological element. The meteorological element includes at least one of a snow element, a water element, a wind element, and an ice element.

The apparatus display method may execute the element display method according to any one of the embodiments of the disclosure, and has functional modules and beneficial effects corresponding to execution of the element display method.

It should be noted that all units and modules included in the apparatus are merely divided according to a functional logic, as long as the corresponding functions may be achieved. In addition, specific names of all functional units are merely for convenience of mutual distinguishing.

Embodiment 7

Figure 8:
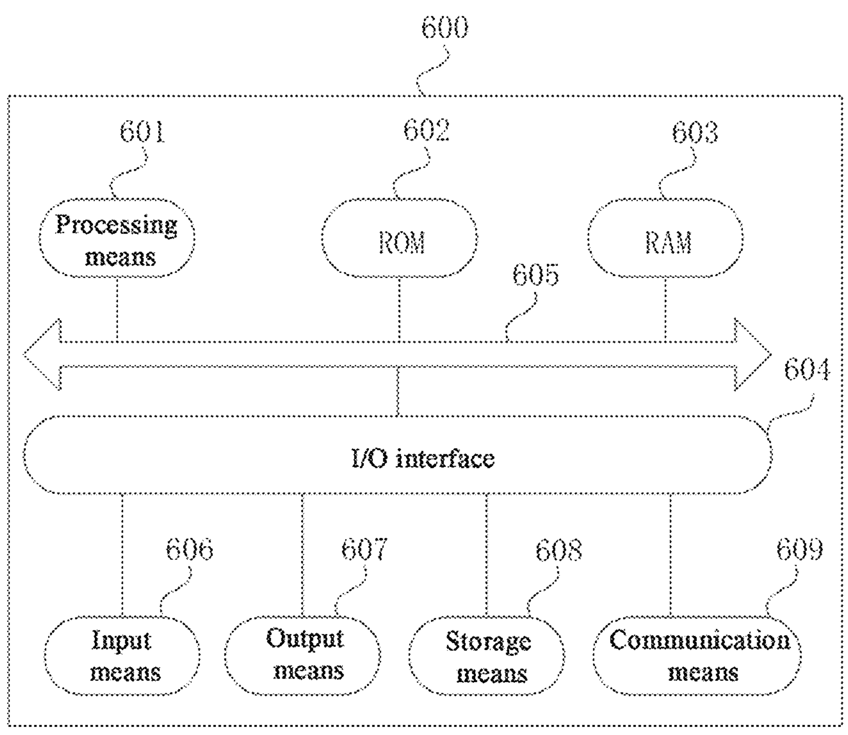
FIG. 8 is a schematic structural diagram of an electronic device according to Embodiment 1 of the disclosure.

FIG. 8 is a schematic structural diagram of an electronic device according to Embodiment 7 of the disclosure. FIG. 8 shows a schematic structural diagram of an electronic device (for example, a terminal device or a server in FIG. 5) 600 suitable for implementing an embodiment of the disclosure below. The terminal device in the embodiment of the disclosure may be a mobile terminal such as a mobile phone, a notebook computer, a digital broadcast receiver, a personal digital assistant (PDA), a portable android device (PAD), a portable media player (PMP), or a vehicle-mounted terminal (for example, a vehicle-mounted navigation terminal), and a fixed terminal such as a digital television (TV) or a desktop computer. The electronic device shown in FIG. 5 is only illustrative.

As shown in FIG. 8, the electronic device 600 may include a processing means (for example, a central processing unit or a graphics processing unit) 601. The electronic device 600 may execute various appropriate actions and processing according to a program stored in a read only memory (ROM) 602 or a program loaded from a storage means 606 to a random access memory (RAM) 603. The RAM 603 further stores various programs and data required for operations of the electronic device 600. The processing means 601, the ROM 602 and the RAM 603 are connected to one another by means of a bus 604. An input/output (I/O) interface 605 is further connected to the bus 604.

Generally, the following means may be connected to the I/O interface 605: an input means 606 including, for example, a touch screen, a touch pad, a keyboard, a mouse, a camera, a microphone, an accelerometer, a gyroscope, etc.; an output means 607 including, for example, a liquid crystal display (LCD), a speaker, a vibrator, etc.; the storage means 606 including, for example, a magnetic tape, a hard disk, etc.; and a communication means 609. The communication means 609 may allow the electronic device 600 to be in wireless or wired communication with other devices so as to achieve data exchange. Although FIG. 8 shows the electronic device 600 including various means, it should be understood that not all the means shown are required to be implemented or included. More or fewer means may be alternatively implemented or included.

Particularly, according to the embodiment of the disclosure, the process described above with reference to the flow diagram may be implemented to be a computer software program. For example, an embodiment of the disclosure includes a computer program product. The computer program includes a computer program born by a non-transitory computer-readable medium. The computer program includes a program code configured to execute the method shown in the flow diagram. In such an embodiment, the computer program may be downloaded and configured from a network through the communication means 609, or configured from the storage means 606, or configured from the ROM 602. The computer program executes the functions in the method according to the embodiment of the disclosure when being executed by the processing means 601.

Names of messages or information exchanged between a plurality of means in the embodiment of the disclosure are only for illustrative purposes.

The electronic device according to the embodiment of the disclosure belongs to the same concept as the element display method according to the above embodiments. Reference may be made to the above embodiments for technical details not described in detail in the embodiment. The embodiment has the same beneficial effects as the above embodiments.

Embodiment 7

An embodiment of the disclosure provides a computer storage medium, which stores a computer program. The computer program implements the element display method according to the embodiment when being executed by a processor.

It should be noted that the computer-readable medium described in the disclosure may be a computer-readable signal medium, or a computer-readable storage medium, or any combination thereof. For example, the computer-readable storage medium may be an electronic, magnetic, optical, electromagnetic, infrared, or semiconductor system, apparatus, or device, or any suitable combination thereof. The computer-readable storage medium may be an electrical connection having on one or more wires, a portable computer disk, a hard disk, a random access memory, a read only memory, an erasable programmable read only memory (EPROM or a flash memory), an optical fiber, a portable compact disk read only memory (CD-ROM), an optical storage device, a magnetic storage device, or any suitable combination thereof. In the disclosure, the computer-readable storage medium may be any tangible medium including or storing a program. The program may be used by or in combination with an instruction execution system, apparatus or device. In the disclosure, the computer-readable signal medium may include a data signal in a baseband or as part of a carrier for transmission, and the data signal carries a computer-readable program code. The transmitted data signal may be in various forms, which may be an electromagnetic signal, an optical signal, or any suitable combination thereof. The computer-readable signal medium may further be any computer-readable medium other than the computer-readable storage medium. The computer-readable signal medium may transmit, propagate or transmit a program used by or in combination with an instruction execution system, apparatus or device. The program code included in the computer-readable medium may be transmitted by any suitable medium including an electric wire, an optical cable, radio frequency (RF), etc., or any suitable combination thereof.

In some embodiments, a client and a server may be in communication with each other with any currently known or future-developed network protocol, for example, a hypertext transfer protocol (HTTP), and may be interconnected with digital data communication (for example, a communication network) in any form or medium. Instances of the communication network include a local area network (LAN), a wide area network (WAN), the internet work (for example, the Internet), an end-to-end network (for example, an ad hoc end-to-end network), and any currently known or future-developed networks.

The computer-readable medium may be included in the electronic device, or may exist independently without being assembled into the electronic device.

The computer-readable medium carries one or more programs. The one or more programs enable, when being executed by the electronic device, the electronic device to: display a weather display element in a target display area according to a first motion trajectory; display, in response to detecting that the weather display element collides with a scene target element in the target display area, the weather display element in the target display area according to a second motion trajectory; and continuously display a weather display element that does not collide with the scene target element in the target display area according to the first motion trajectory.

A computer program code configured to execute an operation of the disclosure may be written in one or more programming languages or a combination thereof. The programming languages include object-oriented programming languages such as Java, Smalltalk, and C++, and further include conventional procedural programming languages such as "C" or similar programming languages. The program code may be executed entirely on a user computer, executed partially on a user computer, executed as a standalone software package, executed partially on a user computer and partially on a remote computer, or executed entirely on the remote computer or a server. In the case involving the remote computer, the remote computer may be connected to the user computer through any type of networks including the LAN or the WAN, or may be connected to an external computer (for example, the remote computer is connected through the Internet by an Internet service provider).

The flow diagrams and block diagrams in the accompanying drawings illustrate system structures, functions and operations, which may be achieved according to systems, methods and computer program products in all the embodiments of the disclosure. In view of that, each block in the flow diagrams or block diagrams may represent a module, a program segment, or part of a code, which includes one or more executable instructions configured to implement specified logic functions. It should further be noted that in some alternative implementations, the functions noted in the blocks may also occur in an order different from that in the accompanying drawings. For example, the functions represented by two continuous blocks may be actually implemented basically in parallel, or may be implemented in reverse orders, which depends on the involved functions. It should further be noted that each block in the block diagrams and/or flow diagrams and combinations of the blocks in the block diagrams and/or the flow diagrams may be implemented with dedicated hardware-based systems that implement the specified functions or operations, or may be implemented with combinations of dedicated hardware and computer instructions.

The units involved in the embodiments described in the disclosure may be implemented by software or hardware. For example, a first obtaining unit may also be described as "a unit obtaining at least two Internet protocol addresses".

The functions described herein may be at least partially executed by one or more hardware logic components. For example, illustrative types of hardware logic components that may be used include: a field programmable gate array (FPGA), an application specific integrated circuit (ASIC), application specific standard parts (ASSPs), a system on chip (SOC), a complex programmable logic device (CPLD), etc.

In the context of the disclosure, the machine-readable medium may be a tangible medium, which may include or store a program used by or used in combination with an instruction execution system, apparatus or device. The machine-readable medium may be a machine-readable signal medium or a machine-readable storage medium. The machine-readable medium may include an electronic, magnetic, optical, electromagnetic, infrared, or semiconductor system, apparatus, or device, or any suitable combination thereof. The machine-readable storage medium may include an electrical connection based on one or more wires, a portable computer disk, a hard disk, RAM, ROM, an erasable programmable read-only memory (EPROM or a flash memory), an optical fiber, CD-ROM, an optical storage device, a magnetic storage device, or any suitable combination thereof.

According to one or more embodiments of the disclosure, [Example 1] provides an element display method. The method includes the following steps:

a weather display element is displayed in a target display area according to a first motion trajectory;

in response to detecting that the weather display element collides with a scene target element in the target display area, the weather display element is displayed in the target display area according to a second motion trajectory; and a weather display element that does not collide with the scene target element is continuously displayed in the target display area according to the first motion trajectory.

According to one or more embodiments of the disclosure, [Example 2] provides the element display method. In the method, optionally, the step that the weather display element is displayed in the target display area according to the first motion trajectory includes the following step:

in response to receiving an effect triggering operation for a target effect scene, a plurality of weather display elements are displayed in the target display area in a preset display form according to the first motion trajectory.

According to one or more embodiments of the disclosure, [Example 3] provides the element display method. The method further includes the following steps:

the scene target element is photographed based on a photographing apparatus, and the scene target element is displayed in the target display area.

According to one or more embodiments of the disclosure, [Example 4] provides the element display method. The method further includes the following steps:

a minimum relative distance between the weather display element and a boundary of the scene target element in the target display area is determined; and whether the scene target element collides with the weather display element is determined according to the minimum relative distance.

According to one or more embodiments of the disclosure, [Example 5] provides the element display method. In the method, optionally, the step that the minimum relative distance between the weather display element and the boundary of the scene target element in the target display area is determined includes the following steps:

an image to be detected that is displayed in the target display area is obtained, where the image to be detected includes the scene target element;

a signed distance field image corresponding to the image to be detected is determined according to the scene target element; and the minimum relative distance between the weather display element and the boundary of the scene target element is determined according to the signed distance field image.

According to one or more embodiments of the disclosure, [Example 6] provides the element display method. In the method, optionally, the step that the signed distance field image corresponding to the image to be detected is determined according to the scene target element includes the following steps:

a target mask image of the image to be detected is determined according to the scene target element; and the signed distance field image corresponding to the image to be detected is determined according to the target mask image.

According to one or more embodiments of the disclosure, [Example 7] provides the element display method. In the method, optionally, the step that the target mask image of the image to be detected is determined according to the scene target element includes the following steps:

a matting processing is performed on the scene target element of the image to be detected to obtain an initial mask image corresponding to the scene target element; and a binarization processing is performed on the initial mask image according to a preset pixel value threshold to obtain the target mask image of the image to be detected.

According to one or more embodiments of the disclosure, [Example 8] provides the element display method. In the method, optionally, the step that the minimum relative distance between the weather display element and the boundary of the scene target element is determined according to the signed distance field image includes the following steps:

first position information of the weather display element in the image to be detected is determined; and a target pixel point corresponding to the first position information in the signed distance field image is determined, and a pixel distance value corresponding to the target pixel point is used as the minimum relative distance between the weather display element and the boundary of the scene target element.

According to one or more embodiments of the disclosure, [Example 9] provides the element display method. In the method, optionally, after it is detected that the weather display element collides with the scene target element in the target display area, and before the weather display element is displayed in the target display area according to the second motion trajectory, the method further includes the following steps:

a target collision point in the scene target element colliding with the weather display element is determined, and first velocity information of the target collision point is computed; and second velocity information of the weather display element is determined according to the first velocity information, and the second motion trajectory of the weather display element is determined according to the second velocity information.

According to one or more embodiments of the disclosure, [Example 10] provides the element display method. In the method, optionally, the step that the first velocity information of the target collision point is computed includes the following steps:

current position information of the target collision point in the image to be detected and last position information of the target collision point in a last image adjacent to display time of the image to be detected in the target display area are determined; and the first velocity information of the target collision point is determined according to the current position information, the last position information, and a preset simulation time step size, where the preset simulation time step size is a preset time variation amount between the image to be detected and the last image.

According to one or more embodiments of the disclosure, [Example 11] provides the element display method. In the method, optionally, the step that the current position information of the target collision point in the image to be detected is determined includes the following steps:

first position information of the weather display element is determined, and a unit normal vector of the boundary of the scene target element at the target collision point is computed according to the first position information; and the current position information of the target collision point in the image to be detected is determined according to the first position information, the minimum relative distance, the unit normal vector, and a preset collision distance threshold.

According to one or more embodiments of the disclosure, [Example 12] provides the element display method. In the method, optionally, the step that the unit normal vector of the boundary of the scene target element at the target collision point is computed according to the first position information includes the following steps:

two first reference pixel points adjacent to a pixel point corresponding to the weather display element in a first preset direction are determined, and two second reference pixel points adjacent to a pixel point corresponding to the weather display element in a second preset direction are determined, where the first preset direction is perpendicular to the second preset direction;

a first difference between pixel distance values corresponding to the two first reference pixel points in the signed distance field image and a second difference between pixel distance values corresponding to the two second reference pixel points in the signed distance field image are computed; and the unit normal vector of the boundary of the scene target element at the target collision point is determined according to the first difference and the second difference.

According to one or more embodiments of the disclosure, [Example 13] provides the element display method. In the method, optionally, the step that the second velocity information of the weather display element is determined according to the first velocity information includes the following steps:

initial relative velocity information of the weather display element relative to the target collision point is determined according to the first velocity information and initial velocity information of the weather display element at a collision moment; and a normal projection velocity component of the initial relative velocity information in a direction of the unit normal vector is computed, and the second velocity information of the weather display element is determined according to the normal projection velocity component.

According to one or more embodiments of the disclosure, [Example 14] provides the element display method. In the method, optionally, the step that the second velocity information of the weather display element is determined according to the normal projection velocity component includes the following steps:

in response to determining that the normal projection velocity component is less than a first preset normal component threshold, a tangential projection velocity component of the initial relative velocity information in a direction of a tangent vector corresponding to the target collision point is computed, where the tangent vector is perpendicular to the unit normal vector;

target relative velocity information of the weather display element relative to the target collision point is determined according to the tangential projection velocity component; and the second velocity information of the weather display element is determined according to the first velocity information and the target relative velocity information.

According to one or more embodiments of the disclosure, [Example 15] provides the element display method. In the method, optionally, the step that the target relative velocity information of the weather display element relative to the target collision point is determined according to the tangential projection velocity component includes the following steps:

a static friction critical velocity at the target collision point is determined, where the static friction critical velocity is determined according to the normal projection velocity component and a preset static friction coefficient corresponding to the target collision point; and the target relative velocity information is determined to be 0 in response to determining that the tangential projection velocity component is less than or equal to the static friction critical velocity.

According to one or more embodiments of the disclosure, [Example 16] provides the element display method. The method further includes the following step:

in response to determining that the tangential projection velocity component is greater than the static friction critical velocity, the target relative velocity information of the weather display element relative to the target collision point is determined according to the normal projection velocity component, the tangential projection velocity component, and the static friction coefficient.

According to one or more embodiments of the disclosure, [Example 17] provides the element display method. In the method, optionally, the step that the second velocity information of the weather display element is determined according to the normal projection velocity component includes the following step:

in response to determining that the normal projection velocity component is greater than a second preset normal component threshold, the second velocity information of the weather display element is determined according to the first velocity information and the initial relative velocity information.

According to one or more embodiments of the disclosure, [Example 18] provides an apparatus display method. The apparatus includes:

a first display module configured to display a weather display element in a target display area according to a first motion trajectory;

a second display module configured to display, in response to detecting that the weather display element collides with a scene target element in the target display area, the weather display element in the target display area according to a second motion trajectory; and a third display module configured to continuously display a weather display element that does not collide with the scene target element in the target display area according to the first motion trajectory.

We claim:

1. An element display method, comprising:

displaying a weather display element in a target display area according to a first motion trajectory, wherein the target display area has a scene target element;

displaying, in response to detecting that the weather display element collides with the scene target element, the weather display element in the target display area according to a second motion trajectory; and continuously displaying a weather display element that does not collide with the scene target element according to the first motion trajectory.

2. The method according to claim 1, wherein displaying the weather display element in the target display area according to the first motion trajectory comprises:

displaying, in response to receiving an effect triggering operation for a target effect scene, a plurality of weather display elements in the target display area in a preset display form according to the first motion trajectory.

3. The method according to claim 1, further comprising:

photographing the scene target element based on a photographing apparatus, to display the scene target element in the target display area.

4. The method according to claim 1, further comprising:

determining a minimum relative distance between the weather display element and a boundary of the scene target element in the target display area; and determining whether the scene target element collides with the weather display element according to the minimum relative distance.

5. The method according to claim 4, wherein determining the minimum relative distance between the weather display element and the boundary of the scene target element in the target display area comprises:

obtaining an image to be detected that is displayed in the target display area, wherein the image to be detected comprises the scene target element;

determining a signed distance field image corresponding to the image to be detected according to the scene target element; and determining the minimum relative distance between the weather display element and the boundary of the scene target element according to the signed distance field image.

6. The method according to claim 5, wherein determining the signed distance field image corresponding to the image to be detected according to the scene target element comprises:

determining a target mask image of the image to be detected according to the scene target element; and determining the signed distance field image corresponding to the image to be detected according to the target mask image.

7. The method according to claim 6, wherein determining the target mask image of the image to be detected according to the scene target element comprises:

performing a matting processing on the scene target element of the image to be detected to obtain an initial mask image corresponding to the scene target element; and performing a binarization processing on the initial mask image according to a preset pixel value threshold to obtain the target mask image of the image to be detected.

8. The method according to claim 5, wherein determining the minimum relative distance between the weather display element and the boundary of the scene target element according to the signed distance field image comprises:

determining first position information of the weather display element in the image to be detected; and determining a target pixel point corresponding to the first position information in the signed distance field image, and using a pixel distance value corresponding to the target pixel point as the minimum relative distance between the weather display element and the boundary of the scene target element.

9. The method according to claim 5, further comprising: after detecting that the weather display element collides with the scene target element in the target display area, and before displaying the weather display element in the target display area according to the second motion trajectory, determining a target collision point in the scene target element colliding with the weather display element, and computing first velocity information of the target collision point; and determining second velocity information of the weather display element according to the first velocity information, and determining the second motion trajectory of the weather display element according to the second velocity information.

10. The method according to claim 9, wherein computing the first velocity information of the target collision point comprises:

determining current position information of the target collision point in the image to be detected and last position information of the target collision point in a last image adjacent to display time of the image to be detected in the target display area; and determining the first velocity information of the target collision point according to the current position information, the last position information, and a preset simulation time step, wherein the preset simulation time step is a preset time variation amount between the image to be detected and the last image.

11. The method according to claim 10, wherein determining the current position information of the target collision point in the image to be detected comprises:

determining first position information of the weather display element, and computing a unit normal vector of the boundary of the scene target element at the target collision point according to the first position information; and determining the current position information of the target collision point in the image to be detected according to the first position information, the minimum relative distance, the unit normal vector, and a preset collision distance threshold.

12. The method according to claim 11, wherein computing the unit normal vector of the boundary of the scene target element at the target collision point according to the first position information comprises:

determining two first reference pixel points adjacent to a pixel point corresponding to the weather display element in a first preset direction, and determining two second reference pixel points adjacent to a pixel point corresponding to the weather display element in a second preset direction, wherein the first preset direction is perpendicular to the second preset direction;

computing a first difference between pixel distance values corresponding to the two first reference pixel points in the signed distance field image and a second difference between pixel distance values corresponding to the two second reference pixel points in the signed distance field image; and determining the unit normal vector of the boundary of the scene target element at the target collision point according to the first difference and the second difference.

13. The method according to claim 11, wherein determining the second velocity information of the weather display element according to the first velocity information comprises:

determining initial relative velocity information of the weather display element relative to the target collision point according to the first velocity information and initial velocity information of the weather display element at a collision moment; and computing a normal projection velocity component of the initial relative velocity information in a direction of the unit normal vector, and determining the second velocity information of the weather display element according to the normal projection velocity component.

14. The method according to claim 13, wherein determining the second velocity information of the weather display element according to the normal projection velocity component comprises:

computing, in response to determining that the normal projection velocity component is less than a first preset normal component threshold, a tangential projection velocity component of the initial relative velocity information in a direction of a tangent vector corresponding to the target collision point, wherein the tangent vector is perpendicular to the unit normal vector;

determining target relative velocity information of the weather display element relative to the target collision point according to the tangential projection velocity component; and determining the second velocity information of the weather display element according to the first velocity information and the target relative velocity information.

15. The method according to claim 14, wherein determining the target relative velocity information of the weather display element relative to the target collision point according to the tangential projection velocity component comprises:

determining a static friction critical velocity at the target collision point, wherein the static friction critical velocity is determined according to the normal projection velocity component and a preset static friction coefficient corresponding to the target collision point; and determining, in response to determining that the tangential projection velocity component is less than or equal to the static friction critical velocity, the target relative velocity information to be 0.

16. The method according to claim 15, further comprising:

determining, in response to determining that the tangential projection velocity component is greater than the static friction critical velocity, the target relative velocity information of the weather display element relative to the target collision point according to the normal projection velocity component, the tangential projection velocity component, and the static friction coefficient.

17. The method according to claim 13, wherein determining the second velocity information of the weather display element according to the normal projection velocity component comprises:

determining, in response to determining that the normal projection velocity component is greater than a second preset normal component threshold, the second velocity information of the weather display element according to the first velocity information and the initial relative velocity information.

18. An electronic device, comprising:

a processor; and a storage means configured to store a program, wherein when the processor executes the program, the processor is caused to:

display a weather display element in a target display area according to a first motion trajectory, wherein the target display area has a scene target element;

display, in response to detecting that the weather display element collides with the scene target element, the weather display element in the target display area according to a second motion trajectory; and continuously display a weather display element that does not collide with the scene target element according to the first motion trajectory.

19. The electronic device according to claim 18, wherein the processor is caused to display the weather display element in the target display area according to the first motion trajectory comprises being caused to:

display, in response to receiving an effect triggering operation for a target effect scene, a plurality of weather display elements in the target display area in a preset display form according to the first motion trajectory.

20. A non-transitory computer-readable storage medium, storing a computer program thereon, wherein the computer program, when being executed by a processor, implements:

displaying a weather display element in a target display area according to a first motion trajectory, wherein the target display area has a scene target element;

displaying, in response to detecting that the weather display element collides with the scene target element, the weather display element in the target display area according to a second motion trajectory; and continuously displaying a weather display element that does not collide with the scene target element according to the first motion trajectory.

* * * * *